(12) United States Patent
Liddicott et al.

(10) Patent No.: US 9,917,882 B2
(45) Date of Patent: Mar. 13, 2018

(54) TRANSPARENT DEFERRED SPOOLING STORE AND FORWARD BASED ON STANDARD NETWORK SYSTEM AND CLIENT INTERFACE

(71) Applicant: DELL SOFTWARE INC., Round Rock, TX (US)

(72) Inventors: Samuel Liddicott, Wakefield (GB); Shane Ohanlon, Annascaul (IE)

(73) Assignee: SONICWALL INC., Santa Clara, CA (US)

( * ) Notice: Subject to any disclaimer, the term of this patent is extended or adjusted under 35 U.S.C. 154(b) by 189 days.

(21) Appl. No.: 14/556,157

(22) Filed: Nov. 30, 2014

(65) Prior Publication Data
US 2016/0156696 A1 Jun. 2, 2016

(51) Int. Cl.
*H04L 29/08* (2006.01)
*H04L 29/06* (2006.01)

(52) U.S. Cl.
CPC .......... *H04L 67/06* (2013.01); *H04L 67/2833* (2013.01)

(58) Field of Classification Search
CPC ........................... H04L 67/2833; H04L 67/06
See application file for complete search history.

(56) References Cited

U.S. PATENT DOCUMENTS

| | | | |
|---|---|---|---|
| 6,826,152 B1 | 11/2004 | Kroon | |
| 7,120,666 B2 | 10/2006 | McCanne et al. | |
| 7,254,636 B1* | 8/2007 | O'Toole, Jr. | G06F 17/30067 707/999.008 |
| 7,716,307 B1* | 5/2010 | Ben-Shaul | G06F 17/30067 709/219 |
| 7,809,693 B2 | 10/2010 | Lango et al. | |
| 8,090,866 B1* | 1/2012 | Bashyam | H04L 69/16 709/212 |
| 8,112,505 B1* | 2/2012 | Ben-Shaul | G06F 17/30168 709/217 |
| 8,176,186 B2 | 5/2012 | McCanne et al. | |
| 8,244,864 B1 | 8/2012 | Bahl et al. | |
| 9,813,526 B2 | 11/2017 | Liddicott | |
| 2003/0065796 A1* | 4/2003 | Borr | G06F 17/30171 709/229 |
| 2003/0084183 A1* | 5/2003 | Odlund | H04L 29/06 709/234 |

(Continued)

OTHER PUBLICATIONS

U.S. Appl. No. 14/591,781 Office Action dated Nov. 18, 2016.

(Continued)

*Primary Examiner* — Abdullahi E Salad
(74) *Attorney, Agent, or Firm* — Polsinelli LLP

(57) ABSTRACT

A transparent batch file transfer is provided from a client to a server via a batch pool system. The batch pool system may be implemented by a proxy file server which is used to receive the file transfer from the client device and free the client device as soon as possible. The file transfer to an intended remote server is carried out by a batch transfer system at the proxy file server. The user of the client machine may then use their device to perform other tasks while the file transfer is completed by the proxy file server batch transfer system. The file transfer is coordinated by a background transfer module that is integrated with file system protocols. Hence, there is no new system or software for a user of the client to learn or operate.

15 Claims, 6 Drawing Sheets

(56) References Cited

U.S. PATENT DOCUMENTS

| | | |
|---|---|---|
| 2003/0204593 A1 | 10/2003 | Brown et al. |
| 2004/0255048 A1 | 12/2004 | Lev Ran et al. |
| 2005/0015461 A1* | 1/2005 | Richard ............ G06F 17/30194 |
| | | 709/217 |
| 2005/0086306 A1* | 4/2005 | Lemke ................ H04L 47/2433 |
| | | 709/206 |
| 2005/0114436 A1* | 5/2005 | Betarbet ................. H04L 67/06 |
| | | 709/203 |
| 2005/0262220 A1* | 11/2005 | Ecklund ............. H04L 67/2823 |
| | | 709/219 |
| 2007/0124477 A1 | 5/2007 | Martin |
| 2007/0250552 A1 | 10/2007 | Lango et al. |
| 2009/0077252 A1 | 3/2009 | Abdo |
| 2009/0222515 A1* | 9/2009 | Thompson ........... H04L 67/104 |
| | | 709/203 |
| 2009/0276543 A1* | 11/2009 | Turner ............... H04N 7/17318 |
| | | 709/248 |
| 2009/0300162 A1 | 12/2009 | Demarie et al. |
| 2010/0098092 A1 | 4/2010 | Luo et al. |
| 2011/0051173 A1 | 3/2011 | Yagishita |
| 2012/0226738 A1* | 9/2012 | Taneja .................... H04L 67/34 |
| | | 709/203 |
| 2012/0257120 A1 | 10/2012 | Nakai |
| 2012/0257500 A1 | 10/2012 | Lynch |
| 2012/0265892 A1* | 10/2012 | Ma ................... H04N 21/23418 |
| | | 709/231 |
| 2013/0091303 A1 | 4/2013 | Mitra et al. |
| 2013/0198868 A1* | 8/2013 | Georgiev .............. G06F 11/203 |
| | | 726/29 |
| 2013/0297679 A1* | 11/2013 | Kim ................... H04N 21/2343 |
| | | 709/203 |
| 2014/0026182 A1* | 1/2014 | Pearl ....................... G06F 21/60 |
| | | 726/1 |
| 2014/0040353 A1* | 2/2014 | Sebastian ................ H04L 67/06 |
| | | 709/203 |
| 2015/0089019 A1* | 3/2015 | Chou ................ G06F 17/30174 |
| | | 709/217 |
| 2016/0085920 A1* | 3/2016 | Cyran ................... G06F 19/322 |
| | | 705/3 |
| 2016/0198020 A1 | 7/2016 | Zhao |
| 2016/0218902 A1 | 7/2016 | Hwang et al. |
| 2016/0335324 A1 | 11/2016 | Caulfield |
| 2016/0352869 A1 | 12/2016 | Liddicott |
| 2017/0041431 A1 | 2/2017 | Liddicott |
| 2017/0366651 A1 | 12/2017 | Liddicott |

OTHER PUBLICATIONS

U.S. Appl. No. 14/821,635 Office Action dated Apr. 24, 2017.
U.S. Appl. No. 14/591,781 Final Office Action dated May 26, 2017.
U.S. Appl. No. 15/690,642, Samuel Liddicott, Reducing Transmission Pathway Lengths Within a Distributed Network, filed Aug. 30, 2017.
U.S. Appl. No. 14/821,635 Final Office Action dated Sep. 22, 2017.
U.S. Appl. No. 14/591,781 Office Action dated Nov. 17, 2017.

* cited by examiner

TRANSPARENT DEFERRED SPOOLING STORE AND FORWARD BASED ON STANDARD NETWORK SYSTEM AND CLIENT INTERFACE

BACKGROUND

As businesses utilization of network and "cloud" solutions for digital storage and processing increases, the performance required from the network and cloud solutions has increased as well. For instance, business operations may require storage or processing of files on a central file server, and as a pre-requisite may require collation of files on the central file server. Files may be transferred to the server using network file server protocols optimized for a LAN (local area network).

As a business grows geographically, some of these files may originate at remote locations with poor network connectivity and so uploading of files using LAN optimized file sharing protocols can be slow.

The slow upload performance can restrict the activities of personnel who must upload the files or whose equipment is in use until the transfer is completed and therefore have negative consequences for the efficiency of the business.

There is a need to reduce the time spent performing uploads so that personnel and equipment can be released for other activities, even while the transfer is still in progress.

SUMMARY

The present technology, roughly described, provides for faster file transfers from a client to a server via a batch pool system. The batch pool system may be implemented by a proxy file server which is used to receive the file transfer from the client device and free the client device as soon as possible. The file transfer to an intended remote server is carried out by a batch transfer system at the proxy file server. The user of the client machine may then use their device to perform other tasks while the file transfer is completed by the proxy file server batch transfer system. The file transfer is coordinated by a background transfer module that is integrated with a client interface. Hence, there is no new system or software for a user of the client to learn or operate.

In an embodiment, a method for transferring files may receive a first file data from a client by a first server. The first file data intended for a second server. A data acknowledgment may be transmitted to the client from first server. A second file data may be received from the client. An indication that transfer is complete may be transmitted to the client by the first server. The first file data and second file data may be transmitted to the second server. A close file request may be transmitted to the second server from the first server.

A system for tracing a distributed transaction may include a processor, memory and one or more modules stored in the memory. The one or more modules may be executable by the processor to receive a first file data from client by first server, the first file data intended for a second server, transmit data acknowledgment to client from first server, receive a second file data from the client, transmit an indication that transfer is complete to the client by the first server, transmit the first file data and second file data to the second server, and transmit a close file request to the second server from the first server.

DETAILED DESCRIPTION

The present technology, roughly described, provides for faster file transfers from a client to a server via a batch pool system. The batch pool system may be implemented by a proxy file server which is used to receive the file transfer from the client device and free the client device as soon as possible. The file transfer to an intended remote server is carried out by a batch transfer system at the proxy file server. The user of the client machine may then use their device to perform other tasks while the file transfer is completed by the proxy file server batch transfer system. The file transfer is coordinated by a background transfer module that is integrated with file system protocols. Hence, there is no new system or software for a user of the client to learn or operate.

The spooler permits faster transfer from the client, but not faster transfer to the server. The batch spooler will continue to transfer to the server at the network speed after the client has disconnected. The present technology allows the user to see a standard interface or view of a remote file server and transparently benefit from batch spooler features.

In a standard batch system, the spooler is generally local to the, and the client can be considered to transfer a file to the spooler, and then another file to the spooler, and so on. The present technology integrates with a network file system protocol (for example, as a proxy). In this perspective, the client sends a portion of a file, which is acknowledged, and then another portion, which is acknowledged, and finally after the last portion is acknowledged, the file is closed. If the network connection is slow, it will take a lot of time until an intended destination server acknowledges the last portion, because each portion must traverse the slow network. The present technology has the proxy acknowledge each portion of the file so the client will send the next portion immediately, before the early acknowledged data has even reached the file server. By acknowledging all data immediately, the client will transfer the whole file and then close the file. The present technology may the close as if it were really closed on the server, while in reality we continue to transfer the file to the server.

While the client supposes to write a file to the server without batch spooling, the present technology causes it to spool the file to use so that we can transfer to the server. Thus the client transparently gets the benefit of a spooling system which is a fast initial transfer. A system administrator can add spooling using this method without altering the user's workflow or behavior.

Figure 1:
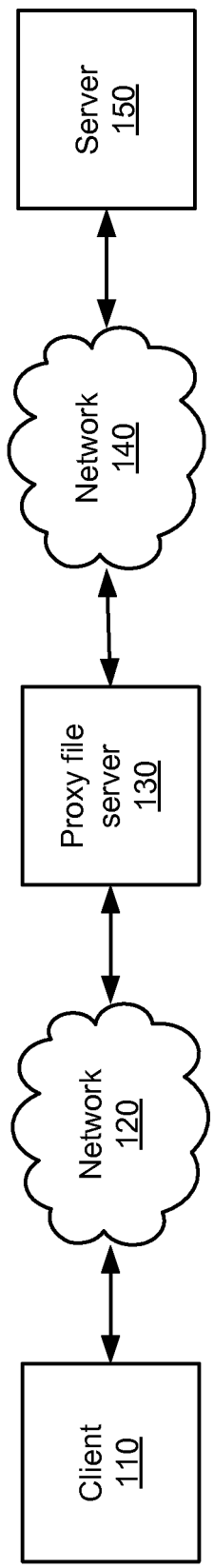
FIG. 1 is a block diagram of a system for performing a batch file transfer

FIG. 1 is a block diagram of a system for performing a batch file transfer. FIG. 1 includes a client 110, network 120, proxy file server 130, network 140, and server 150. A client may perform a batch file transfer with server 150, uploading a batch of files to the server. Network 140 may be a poor performing network, however, which may cause the file transfer to take an undesireably long time. Proxy file server 130 is used to implement a batch spooler transparently, and may be placed close to client 110 and receive the batch files via network 120. The proxy file server may receive the batch of files, freeing up client 110 from the batch file transfer, and may then upload the files to the server 150 automatically. Proxy file server 130 is discussed in more detail below with respect to FIG. 2.

Figure 2:
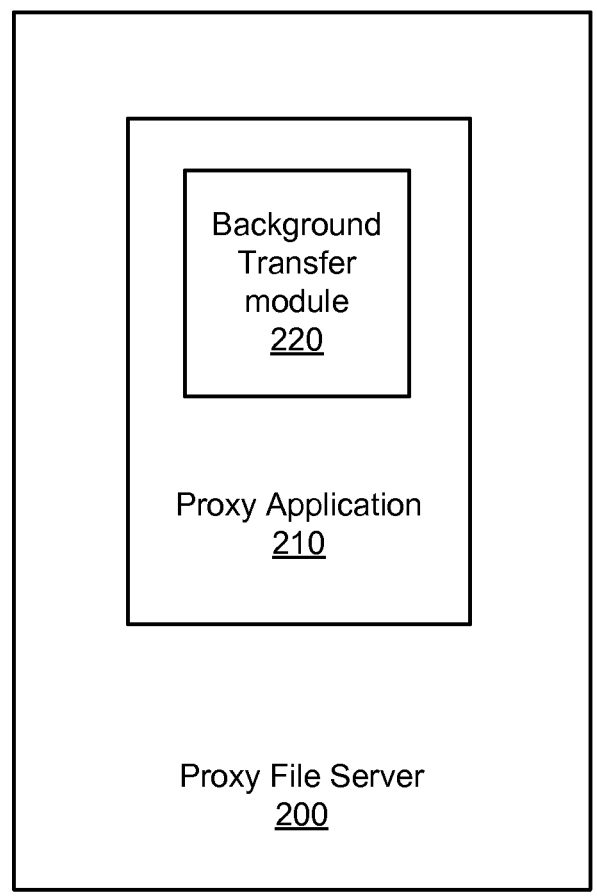
FIG. 2 is a block diagram of a proxy file server.

FIG. 2 is a block diagram of a proxy file server 200. Proxy file server 200 may include a proxy application 210 and background transfer module 220. Proxy file server 210 may provide an interface to client 110 for managing a batch file transfer between client 110 and server 150. The interface may be an administrative interface rather than a user interface, and may allow the user to provide input regarding what files or file types to transfer, when to transfer, and receive other input from the client device user. The interface may also provide the user with information regarding the batch file transfer, such as provide the status of a transfer, the progress of the transfer, and other information. The proxy application 210 may also perform the high level management of the transfer, detect when the transfer is complete, and so forth.

Background transfer module 220 may integrate with proxy application 210 to improve file transfer performance. Background transfer module 220 may be implemented within proxy application 210, for example as a plug-in, or work in conjunction with proxy application 210.

Module 220 may operate at a protocol level to intercept protocol messages and data from the client as well as send messages to the client. For example, module 220 may send acknowledgement messages in response to receiving a file or portion of a file of the batch files. In some instances, the acknowledgement may be sent immediately to initiate the next write request for a file portion as soon as possible. When file portions are received, they may be placed in a buffer until the proxy application can upload them to the server.

When a file transfer is complete from the client side, the client may send a close request. Module 220 may provide a close message, such as a close acknowledgment, back to the client to release the client from the batch file transfer session, even though the files are still being uploaded to the server. The file transfer session will not be closed with the server until the batch files have all been uploaded to the server.

Figure 3:
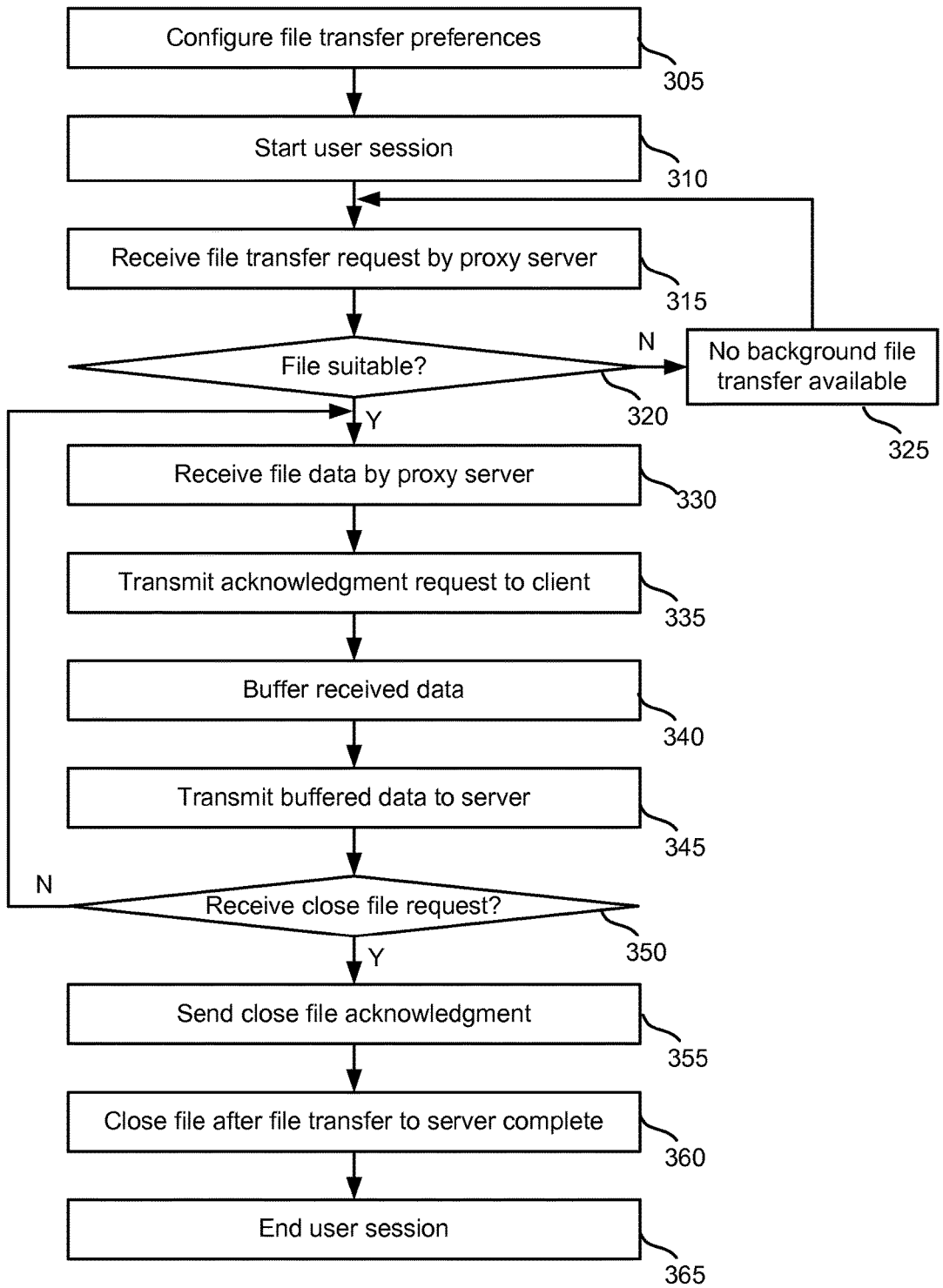
FIG. 3 is a method for performing a background file transfer.

FIG. 3 is a method for performing a background file transfer. File transfer preferences are configured at step 305. File transfer preferences may include specifying what type of file may be suitable for a background file transfer. The preferences may include a particular server, share or folder, a file extension, a filename, and IO operation patterns. The preferences may be set by a user or an administrator through the proxy application 210.

A user session is started at step 310. The user session may include having a user connect to the proxy application from an application on the user client device. A file transfer request is received by the proxy server from the client at step 315. The file transfer request may indicate the files, file locations, and other data associated with a batch of files to transfer from the client to a particular server. A determination is made as to whether the files are suitable for background file transfer at step 320. In some instances, the determination may be made later, for example after a file or portion of the file has already been transferred. The file may be suitable if it satisfies one or more preferences for background file transfer. Determining whether a file is suitable for background transfer is discussed in more detail below with respect to FIG. 4. If the file subject to the file transfer request is not suitable for background file transfer, the file is not uploaded to the server via background file transfer at step 325 and the operation of the method continues to step 315. The file may be uploaded via another means of uploading or the file transfer may be denied.

If the file is suitable for background transfer, the file data, such as for example a portion of the file, may be received by proxy server 130 at step 330. The file transfer of the batch of files commences, with the first file or file portion received at step 330. A transmit acknowledgment is transmitted to the client at step 335. The acknowledgment is sent by the background transfer module immediately after receiving the first file or file portion. As such, the acknowledgment is sent before the file is received and stored at the intended destination—server 150. By providing the acknowledgment immediately, the client may then proceed to send the next batch file or file portion, thereby expediting the time to receive the files from the client by the proxy server.

The received data is buffered at step 340. The buffered data may be sent to the intended recipient—server 150—at step 345. The time to send the buffered data to the server by the proxy server will take longer than the time to receive the data from the client by the proxy server. In some instances, files or file portions may be received from the client and stored in the buffer, with acknowledgements sent immediately to the client, until there are no further files or portions in the batch. The files or file portions in the buffer may be sent to the server in parallel with the data being received from the client. Hence, steps 330-340 and step 345 may describe processes that are performed simultaneously rather than in lock step.

A determination is made as to whether a close file request is received by the proxy server from the client at step 350. Once the last file or file portion is received by the proxy server, the close file request will be received by the proxy server from the client. If the close file request has not been received from the client, at least one additional file or file portion need to be sent and the method continues to step 330. If the close file request has been received, a close file acknowledgment is sent to client 110 from proxy server 130 at step 355. The close file acknowledgment will allow the client to end the file transfer session and be utilized for different purposes.

The proxy server continues to transmit files or file portions to server 150 as long as there is file data in the proxy file buffer. Once all the file data has been sent to the client, a close file message is sent to the server at step 360. The user session with the server is then closed at step 365. Hence, the user session with the client will be closed before the user session with the server is closed.

Figure 4:
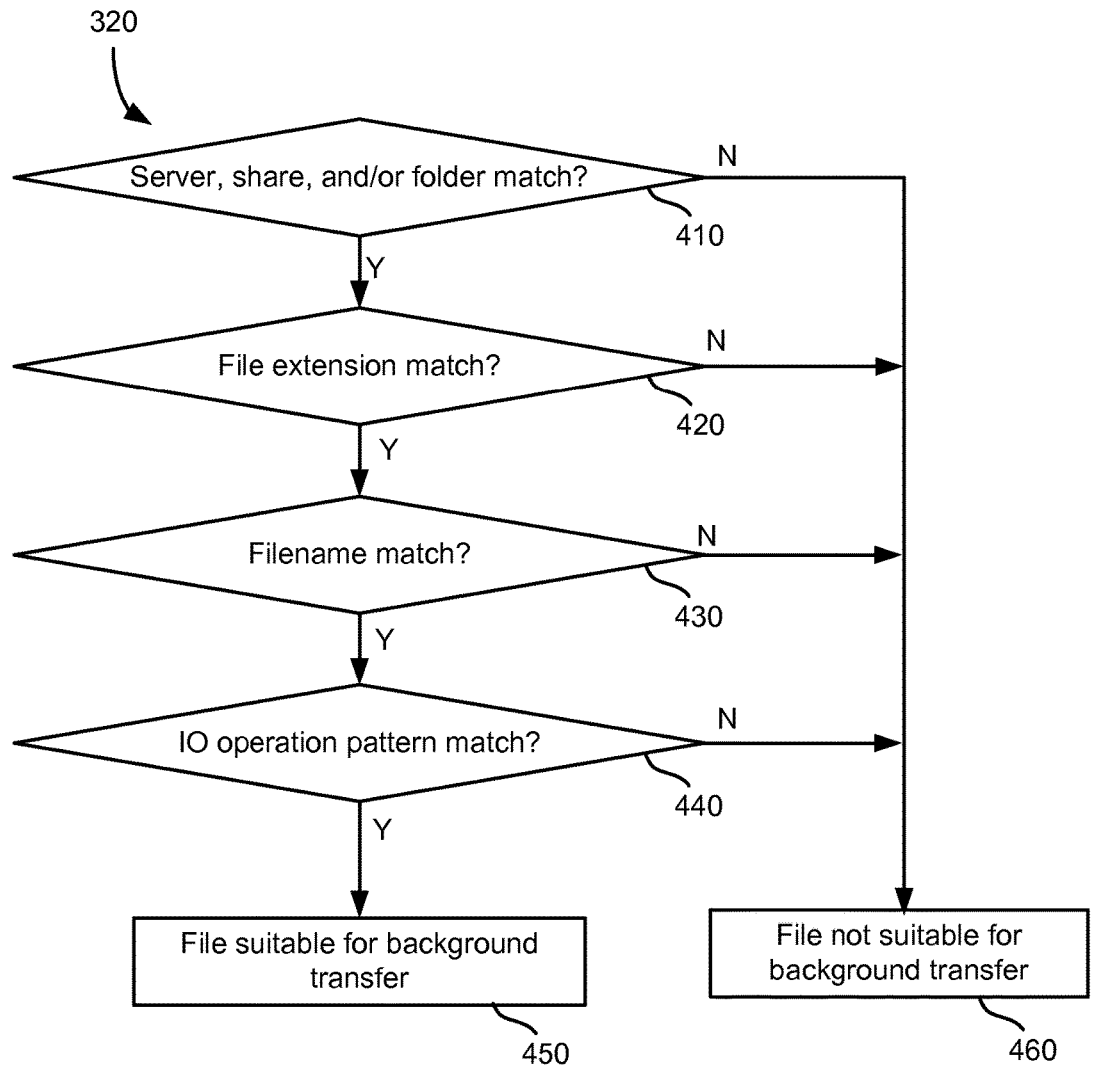
FIG. 4 is a method identifying a suitable file for background file transfer.

FIG. 4 is a method identifying a suitable file for background file transfer. The method of FIG. 4 provides more detail for step 320 of the method of FIG. 3.

Steps 410-440 relate to a list of background transfer preferences to be satisfied. The steps in the method of FIG. 4 set forth the preferences in an exemplary order for purposes of discussion. A background file transfer system may not require each and every preference associated with steps 410-440 to be determined in the affirmative in order to proceed with a background file transfer. For example, a proxy application may require only one preference be satisfied, or that a particular combination of preferences be satisfied.

A determination is made as to whether the request to perform a background file transfer involves a server, share or folder that matches a background file preference at step 410. If the server, share or folder in the request does not match that specified in the preference, then the method continues to step 460.

A determination is made as to whether the request to perform a background file transfer involves a file extension that matches a background file preference at step 420. If the file extension in the request does not match that specified in the preference, then the method continues to step 460.

A determination is made as to whether the request to perform a background file transfer involves a filename that matches a background file preference at step 430. If the filename in the request does not match that specified in the preference, then the method continues to step 460.

A determination is made as to whether the request to perform a background file transfer involves an IO operation pattern match that matches a background file preference at step 440. If the IO operation pattern match in the request does not match that specified in the preference, then the method continues to step 460.

If the request complies with the preferences at steps 410-440, the file is suitable for background transfer at step 450. If the request does not comply with the preferences in any of steps 410-440, the file is not suitable for background transfer at step 460.

Figure 5:
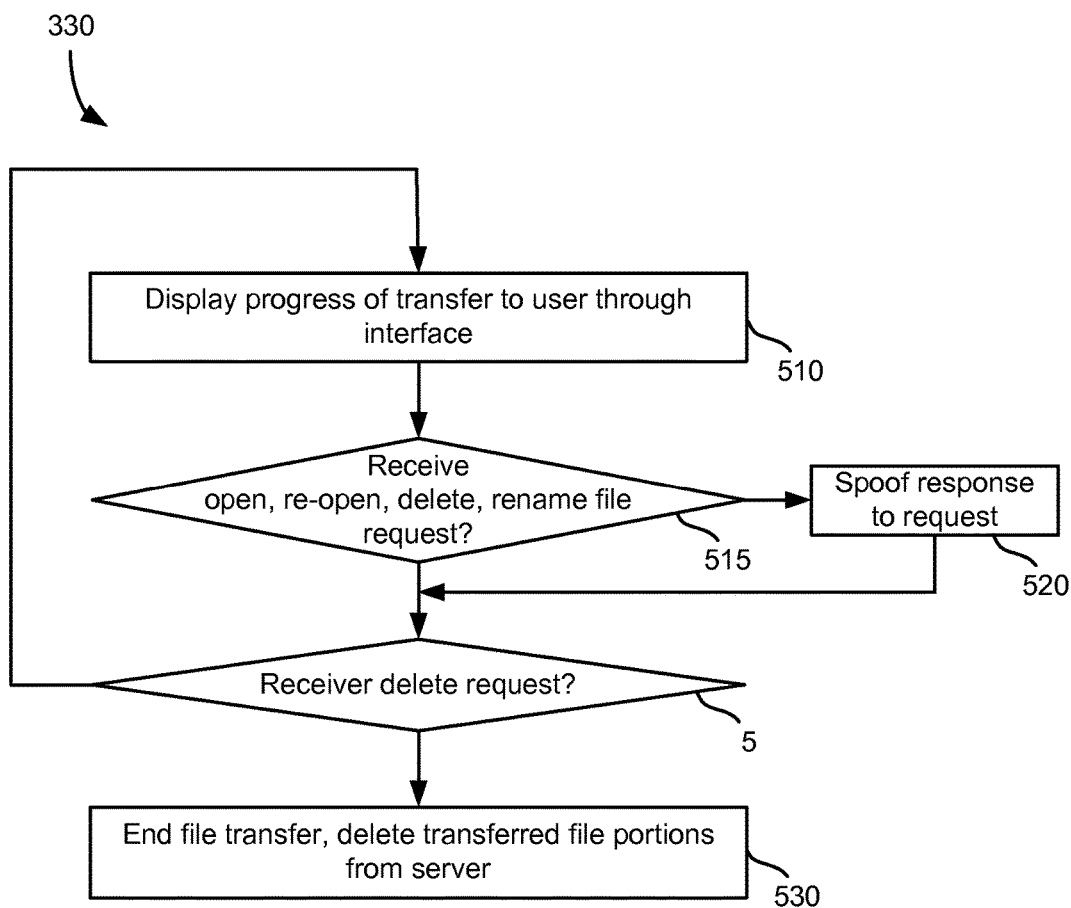
FIG. 5 is a method for managing a background file transfer.

FIG. 5 is a method for managing a background file transfer. The method of FIG. 5 provides details for handling user input through an administrative interface provided by a proxy application. The interface may be utilized for initial configuration as well as during background file transfer performed at step 330 of the method of FIG. 3. The interface may provide a progress of the background transfer to the user at step 310. A determination may be made as to whether the interface receives input from a user to open, re-open, delete or rename the file at step 315. If the input is received, denied response to the client request may be spoofed at step 320, perform some other appropriate action, and the operation of the method continues to step 325. In some instances, the administrative interface may allow a file open for metadata access and deletion but prohibit rename, write and read operations.

Some requests may be selectively permitted. The intent of the user may be inferred from the requests and mapped into a suitable operation on the spooling system. For example, "delete" attempts may abort a transfer and delete the partially transferred file, while open attempts may be permitted but use of the file handle may be restricted to reading meta data (file date, size, ownership, etc) and denying reading/writing or renaming the file.

If the request is not received, a determination is made as to whether input is received from a user to delete the background file transfer at step 325. If no abort request is received, progress of the transfer continues to be provided through the interface until the transfer is complete. If the abort request is received, the file transfer is stopped and any portion of the batch of files that was transferred to server 150 from proxy server 130 is deleted at step 325.

Figure 6:
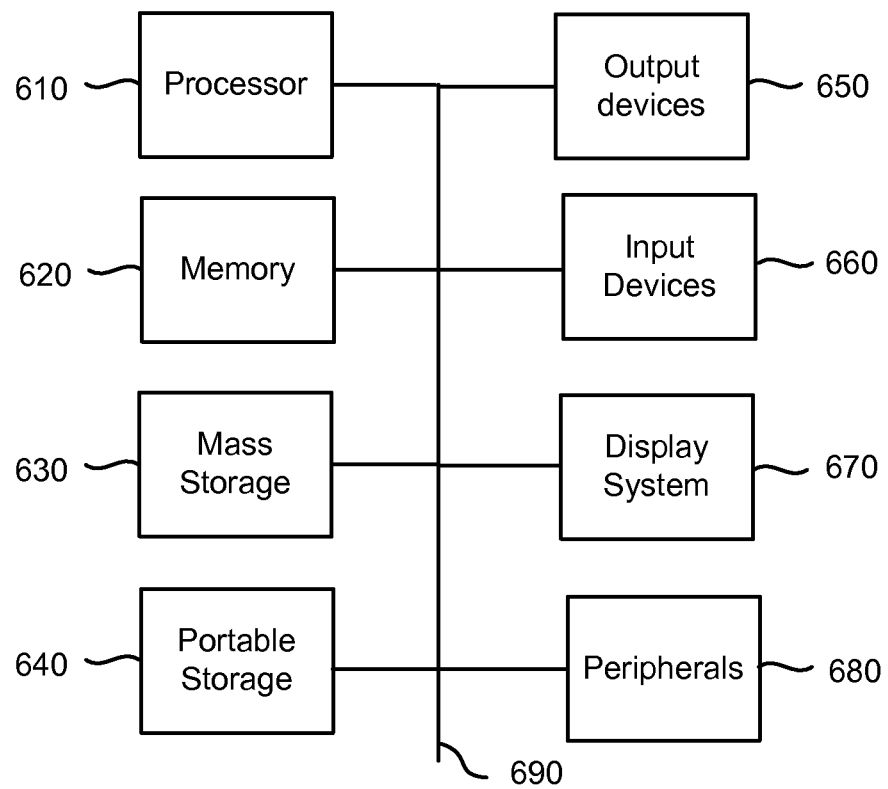
FIG. 6 is a block diagram of a computing system for implementing the present technology.

FIG. 6 is a block diagram of an exemplary computing system for implementing the present technology. System 600 of FIG. 6 may be implemented in the contexts of the likes of client computer 110, proxy server 130, and server 150. The computing system 600 of FIG. 6 includes one or more processors 610 and memory 620. Main memory 620 stores, in part, instructions and data for execution by processor 610. Main memory 620 can store the executable code when in operation. The system 600 of FIG. 6 further includes a mass storage device 630, portable storage medium drive(s) 640, output devices 650, user input devices 660, a graphics display 670, and peripheral devices 680.

The components shown in FIG. 6 are depicted as being connected via a single bus 690. However, the components may be connected through one or more data transport means. For example, processor unit 610 and main memory 620 may be connected via a local microprocessor bus, and the mass storage device 630, peripheral device(s) 680, portable storage device 640, and display system 670 may be connected via one or more input/output (I/O) buses.

Mass storage device 630, which may be implemented with a magnetic disk drive or an optical disk drive, is a non-volatile storage device for storing data and instructions for use by processor unit 610. Mass storage device 630 can store the system software for implementing embodiments of the present invention for purposes of loading that software into main memory 620.

Portable storage device 640 operates in conjunction with a portable non-volatile storage medium, such as a floppy disk, compact disk or Digital video disc, to input and output data and code to and from the computer system 600 of FIG. 6. The system software for implementing embodiments of the present invention may be stored on such a portable medium and input to the computer system 600 via the portable storage device 640.

Input devices 660 provide a portion of a user interface. Input devices 660 may include an alpha-numeric keypad, such as a keyboard, for inputting alpha-numeric and other information, or a pointing device, such as a mouse, a trackball, stylus, or cursor direction keys. Additionally, the system 600 as shown in FIG. 6 includes output devices 650. Examples of suitable output devices include speakers, printers, network interfaces, and monitors.

Display system 670 may include a liquid crystal display (LCD) or other suitable display device. Display system 670 receives textual and graphical information, and processes the information for output to the display device.

Peripherals 680 may include any type of computer support device to add additional functionality to the computer system. For example, peripheral device(s) 680 may include a modem or a router.

The components contained in the computer system 600 of FIG. 6 are those typically found in computer systems that may be suitable for use with embodiments of the present invention and are intended to represent a broad category of such computer components that are well known in the art. Thus, the computer system 600 of FIG. 6 can be a personal computer, hand held computing device, telephone, mobile computing device, workstation, server, minicomputer, mainframe computer, or any other computing device. As such, the computer system 600 of FIG. 6 may include additional components, such as an LED touch screen, one or more antennas, radios, and other circuitry and software for wireless communication, microphones, speakers, and other components. The computer can also include different bus configurations, networked platforms, multi-processor platforms, etc. Various operating systems can be used including Unix, Linux, Windows, Macintosh OS, Android, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for transferring files, the method comprising:
providing a management interface for managing file transfer by a proxy application;
integrating a background transfer module with the proxy application, wherein the background transfer module transmits a data acknowledgement and an indication to a client device;
receiving a portion of a first file from the client device by a proxy file server, the first file portion intended for a second server, wherein the first file portion is received based on one or more preferences set over the management interface, the one or more preferences indicating that the proxy file server is allowed to transmit data of the first file to the second server and identifying at least one of a file extension, a file name, or an I/O server;
transmitting the data acknowledgment to the client device from the proxy file server via the background transfer module;
receiving a second file portion from the client device;
transmitting an indication that transfer is complete to the client device by the proxy file server;
transmitting the first file portion and the second file portion to the second server; and
transmitting a close file request to the second server from the proxy file server.

2. The method of claim 1, wherein the indication to the client device that the transfer is complete is a close file acknowledgement.

3. The method of claim 1, wherein the data acknowledgement is transmitted to the proxy file server immediately in response to receipt of the data from the first file.

4. The method of claim 1, further comprising:
terminating a connection with the client device by the proxy file server after transmitting the indication; and
maintaining a connection with the second server by the proxy file server until the first file portion and second file portion are transmitted to the second server.

5. The method of claim 1, further comprising:
receiving a request to open, delete, or rename a file comprised of the first file portion and second file portion, the request received by the proxy file server while the first file portion or second file portion is transferred to the second server; and
denying the request.

6. The method of claim 1, further comprising:
receiving a request to abort the transfer of a file to the second server;
terminating the transfer of first file portion and second file portion to the second server by the proxy file server; and
deleting any first file portion and second file portion already transferred to the second server.

7. A non-transitory computer readable storage medium having embodied thereon a program, the program being executable by a processor to perform a method transferring files, the method comprising:
providing a management interface for managing file transfer by a proxy application;
integrating a background transfer module with the proxy application, the background transfer module configured to transmit a data acknowledgement and an indication to a client device;
receiving a portion of a first file from the client device by a proxy file server, the first file portion intended for a second server, wherein the first file portion is received based on one or more preferences set over the management interface and indicating that the proxy file server is allowed to transmit data of the first file to the second server and identifying at least one of a file extension, a file name, or an I/O server;
transmitting the data acknowledgment to the client device from the proxy file server;
receiving a second file portion from the client device;
transmitting an indication that transfer is complete to the client device by the proxy file server;
transmitting the first file portion and second file portion to the second server; and
transmitting a close file request to the second server from the proxy file server.

8. The non-transitory computer readable storage medium of claim 7, wherein the indication to the client device that the transfer is complete is a close file acknowledgement.

9. The non-transitory computer readable storage medium of claim 7, wherein the data acknowledgement is transmitted to the proxy file server immediately in response to receipt of the data from the first file.

10. The non-transitory computer readable storage medium of claim 7, further comprising instructions executable to:
terminate a connection with the client device by the proxy file server after transmitting the indication; and
maintain a connection with the second server by the proxy file server until the first file portion and second file portion are transmitted to the second server.

11. The non-transitory computer readable storage medium of claim 7, further comprising instructions executable to:
receive a request to open, delete, or rename a file comprised of the first file portion and second file portion, the request received by the proxy file server while the first file portion or second file portion is transferred to the second server; and
deny the request.

12. The non-transitory computer readable storage medium of claim 7, further comprising instructions executable to:
receive a request to abort the transfer of a file to the second server;
transmit the transfer of first file portion and second file portion to the second server by the proxy file server; and
delete any first file portion and second file portion already transferred to the second server.

13. An apparatus for transferring files, the apparatus comprising:
a user interface that provides an interface for managing file transfer by a proxy application;
a processor of a proxy file server that executes one or more modules stored in memory, wherein execution of the modules by the processor integrates a background transfer module with the proxy application, wherein the background transfer module transmits a data acknowledgement and an indication to a client device; and
a computer network interface that:
receives a first file portion from the client device, the first file portion intended for a second server, wherein the first file portion is received based on one or more preferences set over the management interface, the one or more preferences indicating that the first server is allowed to transmit data of the first file to the second server and identifying at least one of a file extension, a file name, or an I/O server,
transmits the data acknowledgment to the client device via the background module,
receives a second file portion from the client device, transmits an indication that transfer is complete to the client device, transmits the first file portion and second file portion to the second server, and transmits a close file request to the second server.

14. The apparatus of claim 13, wherein the indication to the client device that the transfer is complete is a close file acknowledgement.

15. The apparatus of claim 13, wherein the data acknowledgement is transmitted immediately in response to receipt of the data from the first.

* * * * *